UNITED STATES PATENT OFFICE.

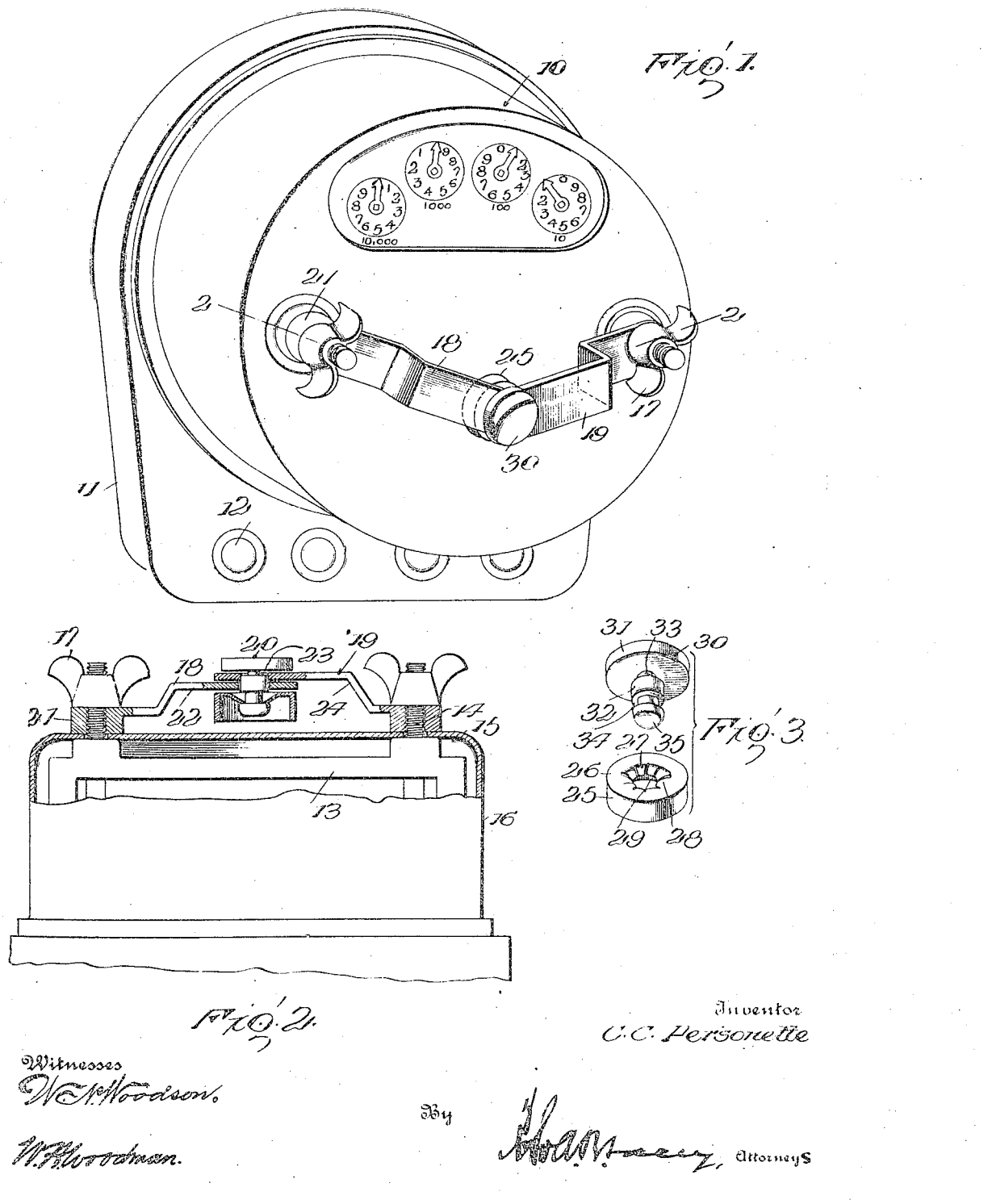

CHARLES C. PERSONETTE, OF ST. LOUIS, MISSOURI.

METER-SEAL.

1,179,648.  Specification of Letters Patent.  Patented Apr. 18, 1916.

Application filed January 12, 1915. Serial No. 1,807.

*To all whom it may concern:*

Be it known that I, CHARLES C. PERSONETTE, a citizen of the United States, residing in the city of St. Louis and State of Missouri, have invented certain new and useful Improvements in Meter-Seals, of which the following is a specification.

My invention relates to new and useful improvements in seals for electric meters, the primary object of my invention being the provision of a device for securing the meter casing to its base in order to prevent unauthorized tampering with the meter by a subscriber or, in fact, by any one not having the right of access thereto.

More specifically, one of the chief objects of my invention consists in the provision of a frangible seal which may be employed in securing the casing in place and which can be removed to permit removal of the casing only by breaking a portion of the seal. As the frangible portion of the seal, which is to be broken, cannot be obtained except through recognized channels, any tampering with the seal will be readily recognized by the mere inspection of the meter by the proper official.

With the majority of electric meters now in use, the registering mechanism proper is mounted upon a suitable frame carried by the base, the wires being run to such mechanism through ducts formed in the base and the mechanism itself being inclosed in a light metallic casing or housing secured to the base and frame by means of threaded studs passed through openings in the casing and receiving winged clamping nuts. It will of course be clear that these clamping nuts may be readily removed, the casing removed and the recording mechanism exposed by unauthorized, as well as by an authorized person.

My invention consists in the provision of means applicable to the threaded studs for securing the casing in place, said means including a pair of clamping devices which, when applied, are coupled together by a frangible seal.

In this connection, a still further object of my invention is to so construct the frangible seal and the clamping devices that the clamping devices cannot be released except by breaking of the seal. It will, therefore, be clear that unless the person tampering with the meter has duplicate seals, it will be impossible for him to avoid discovery.

A still further object of my invention consists in the provision of a seal of the above described character which will be simple and economical in construction and efficient in use.

With these and other objects in view, my invention will be more fully described, illustrated in the accompanying drawing, and then specifically pointed out in the claims which are attached to and form a part of this application.

In the drawing: Figure 1 is a perspective view of a conventional form of electric meter, showing my improved seal in use; Fig. 2 is a fragmentary sectional view taken on the line 2—2 of Fig. 1, only a portion of the casing being broken away as the meter mechanism proper forms no part of the present invention and need not be disclosed; Fig. 3 is an unassembled perspective view of the seal proper before application to the clamping members.

Corresponding and like parts are referred to in the following description and indicated in all the views of the drawing by the same reference characters.

In order to insure a clear and accurate understanding of my invention and its operation, I have illustrated it in connection with a conventional form of electric meter 10 including a base 11 having ducts 12 through which the current carrying wires are passed and supporting a frame 13 having forwardly projecting, threaded studs 14 which pass through openings 15 in the front or outer face of the casing or housing 16, such face of the casing or housing preferably engaging against portions of the frame 13 when in place. Under ordinary circumstances, the casing is secured to the base 11 merely by threading winged nuts 17 upon the studs 14 to clamp the casing against the frame 13.

My invention consists in the provision of clamping members and a seal co-acting with the clamping members, the clamping members being applicable to the threaded studs and being capable of use either with or without the winged nuts 17, as preferred. More specifically, my invention includes a pair of clamping members 18 and 19 and the seal indicated as a whole by the numeral 20. The members 18 and 19 are identical in construction and a description of one will suffice for both. Each of these members includes a body portion 21 in the form of a nut, the peripheral face of which may be either cylindrical or formed with angularly disposed faces, as preferred. Extending radially from this body portion, is an arm 22, preferably formed integrally with the body portion and provided near its free end with an opening 23. These arms may be offset intermediate their length as shown at 24, if deemed advisable, in order to space their free ends from the forward face of the casing 16. These clamping members are of such length that when their body portions are threaded upon the studs 14, their free end portions may be swung to overlap each other and therefore bring the openings 23 into alinement. Preferably, the clamping members are considerably longer than the direct distance between the studs with which they are to operate in order that the device may be applied to meters of different sizes and in which the studs are located at different distances, the clamping members being usually disposed at an angle to each other, as shown in Fig. 1, the acuteness of the angle depending upon the space between the studs and the length of the clamping members. Co-acting with these clamping members, is the seal proper 20 which includes a locking cup 25 in the form of a hollow metallic cylinder having a relatively thick peripheral wall and closed at one end by a relatively thin resilient wall 26 provided centrally with an opening 27 and slotted radially from this opening as shown at 28, the resultant tongues or prongs 29 being down struck slightly to provide spring retaining prongs or fingers surrounding the central opening 27. Co-acting with this locking cup, is a frangible locking stud, indicated as a whole by the numeral 30 and including a disk-shaped thumb piece or body portion 31 provided centrally with a cylindrical shank 32. This shank is reduced in thickness at its point of juncture with the body portion, as shown at 33, and is provided with a peripheral groove or channel 34 adjacent its free end, which end is rounded, as shown at 35. This locking stud is formed of frangible material, such as porcelain, glass or the like and its rounded terminal 35 is proportioned to be forced through the opening 27 of the locking cup in such a manner that the prongs 29 will lockingly seat in the peripheral groove or channel 34. As shown in Fig. 2 of the drawing, the lower shoulder formed by this channel will retain the prongs and prevent separation of the locking stud from its cup.

In use, the clamping members are threaded one upon each of the studs 14 and turned as tightly as possible with their free ends overlapping each other to bring the openings 23 into alinement. The locking cup 25 is then positioned against the inner face of the innermost of these members and the rounded terminal of the locking stud is passed through the openings 23 of the clamping members and forced through the opening 27 of the locking cup 25. Under these conditions, the locking cup and locking stud are permanently interlocked and the clamping members 18 and 19 are therefore held against any independent turning movement. When in this position, the portions 32 and 33 of the shank rest in the openings 23 of the locking members, the locking cup 25 engages against the inner face of the innermost of the clamping members and the head 31 against the outermost.

In order to release the clamping members and permit their removal from the studs, it is necessary to fracture the clamping stud and it is for this reason that its shank 32 is reduced at 33. Under these circumstances, a relatively light blow against the edge of the finger piece or disk portion 31 of the stud will break the shank at the reduced portion 33 and therefore permit removal of the stud portions from the clamping arms. It will of course be clear that the winged nuts may be threaded upon the studs to act as lock nuts, if desired, but they are in no way necessary with my improved seal.

The outer face of the head or thumb piece 31 of the clamping stud is preferably concaved to prevent one's thumb from slipping during application of the stud and any characteristic lettering or numbering may be applied to the thumb piece in order that each authorized person may have individual seals. I of course retain the right to employ the seal for other purposes than the securing of electric meters, intending to employ it for any purpose for which it may be adapted.

Although I have illustrated and described my invention in all its details, I do not wish to be limited to the specific feature disclosed, as various changes, within the scope of the appended claims, may be made at any time, if desired, without in the slightest degree departing from the spirit of my invention.

Having thus described the invention, what is claimed as new is:

1. The combination with a meter including a cover having studs extending therethrough, of clamping members having their outer ends provided with thickened portions engaging the studs and their inner ends overlapped and movable to different positions with respect to the cover, the intermediate portions of the clamping members being offset and lying in a plane beyond the outer faces of the thickened portions of said members, a locking cup lying within the space formed by the offset portions of the clamping members, a frangible stud extending through the overlapped ends of the clamping members and engaging the locking cup, and means engaging the studs and bearing against the thickened portions of the clamping members for holding said clamping members in adjusted position.

2. The combination with a meter including a cover having threaded studs extending therethrough, of clamping members having their outer ends threaded on said studs and their inners ends overlapped and movable to different positions with respect to the cover, the intermediate portions of the clamping members being offset to provide a clearance between the members and the cover, a locking cup disposed at the offset portions of the members and having its outer end closed and provided with resilient tongues and its inner end open and spaced from the cover, a frangible stud extending through the overlapped ends of the clamping members and provided with a head engaging the resilient tongues on the locking cup, and means engaging the threaded studs and bearing against the outer ends of the clamping members for holding said clamping members in adjusted position.

3. A device of the class described including coacting clamping members having their outer ends provided with means for attachment to a support and their inner ends overlapped, and a sealing device including a locking cup having one end thereof open and its other end closed and provided with resilient locking tongues, and a frangible stud extending through the overlapped ends of the clamping members and provided with a terminal head engaging the resilient tongues, said head terminating short of the open end of the locking cup and being entirely housed within the lines of the latter.

4. The combination with clamping members having their outer ends provided with means for attachment to a support and their inner ends offset and overlapped, of a sealing device including a cup arranged at the offset portions of the clamping members and having one end thereof closed and provided with resilient tongues and its other end open, and a frangible locking stud extending through the overlapped ends of the clamping members and having one end thereof provided with a finger piece and its other end formed with a head engaging the resilient tongues, said head terminating short of the open end of the locking cup and being disposed entirely within the lines of the latter.

5. The combination with clamping members having their outer ends provided with means for attachment to a support and their inner ends overlapped and provided with alined openings, the intermediate portions of the clamping members being bowed laterally, of a sealing device including a locking cup disposed at the bowed portions of the clamping members and having that end thereof which faces said clamping members closed and provided with resilient tongues and its other end open, and a frangible locking stud having an enlarged cylindrical portion seated in the openings of the clamping members and provided at one end with a finger piece and at its other end with a terminal head engaging the resilient tongues, said head terminating short of the open end of the locking cup and being disposed entirely within the lines of the latter.

In testimony whereof I affix my signature in presence of two witnesses.

CHARLES C. PERSONETTE. [L. S.]

Witnesses:
ALVIN J. L. FABER,
HERBERT J. BRANDENBURGER.